(12) United States Patent
Nessler

(10) Patent No.: US 7,434,069 B2
(45) Date of Patent: Oct. 7, 2008

(54) METHOD AND DEVICE FOR ENCRYPTION/DECRYPTION OF DATA ON MASS STORAGE DEVICE

(75) Inventor: Kai-Wilhelm Nessler, Mandal (NO)

(73) Assignee: High Density Devices AS, Mandal (NO)

( * ) Notice: Subject to any disclaimer, the term of this patent is extended or adjusted under 35 U.S.C. 154(b) by 731 days.

(21) Appl. No.: 10/259,733

(22) Filed: Sep. 30, 2002

(65) Prior Publication Data

US 2003/0070083 A1  Apr. 10, 2003

Related U.S. Application Data

(60) Provisional application No. 60/325,168, filed on Sep. 28, 2001.

(51) Int. Cl.
- *G06F 12/14* (2006.01)
- *H04L 9/00* (2006.01)
- *H04K 1/00* (2006.01)
- *H04K 1/06* (2006.01)

(52) U.S. Cl. .................. 713/193; 713/162; 713/165; 726/26; 380/255; 380/264; 380/37; 380/44; 380/28

(58) Field of Classification Search ............ 713/193
See application file for complete search history.

(56) References Cited

U.S. PATENT DOCUMENTS

| | | | | |
|---|---|---|---|---|
| 5,261,003 A * | 11/1993 | Matsui | ...... | 380/264 |
| 5,995,623 A * | 11/1999 | Kawano et al. | ...... | 713/189 |
| 6,157,722 A * | 12/2000 | Lerner et al. | ...... | 380/260 |
| 6,178,244 B1 * | 1/2001 | Takeda et al. | ...... | 380/277 |
| 6,519,762 B1 * | 2/2003 | Colligan et al. | ...... | 717/170 |
| 2001/0018736 A1 * | 8/2001 | Hashimoto et al. | ...... | 713/1 |
| 2003/0159140 A1 * | 8/2003 | Candelore | ...... | 725/31 |

(Continued)

FOREIGN PATENT DOCUMENTS

GB  2353191 A  *  2/2001

(Continued)

OTHER PUBLICATIONS

Menezes et al, Handbook of Applied Cryptography, 1997, CRC Press LLS, pp. 515-517.*

(Continued)

*Primary Examiner*—Ayaz Sheikh
*Assistant Examiner*—Aravind K Moorthy
(74) *Attorney, Agent, or Firm*—Young & Thompson

(57) ABSTRACT

A method and device performing encryption/decryption of data on a mass storage media. A plurality of different encryption/decryption algorithms with associated keys can be utilised on different storage areas of the media, such as blocks/sectors on a hard disk drive, thereby increasing the security of the data significantly. In addition, combining the keys with random numbers for a further increase of the security of the data. The block/sector number is used to select an algorithm with associated key and random number. The device and method encrypts/decrypts emails, networking traffic etc. and other types of electronic data. In addition, the device provides an authentication session when booting a computer from a hard disk drive, and even be used to select a certain operating system and/or environment associated with a certain key carrier by changing the Master Boot Record of the disk system.

37 Claims, 8 Drawing Sheets

U.S. PATENT DOCUMENTS

2005/0177749 A1* 8/2005 Ovadia ................. 713/201
2005/0192904 A1* 9/2005 Candelore ............... 705/51
2008/0084995 A1* 4/2008 Rodgers ................. 380/28

FOREIGN PATENT DOCUMENTS

| WO | WO0004681 | * | 1/2000 |
| WO | WO0241101 A2 | * | 5/2002 |
| WO | WO02101971 A2 | * | 12/2002 |

OTHER PUBLICATIONS

Curtmola et al, Searchable Symmetric Encryption: Improved Definitions and Efficient Constructions, 2006, ACM, pp. 79-88.*

Simpson et al, Segment Protection for Embedded Systems Using Run-time Checks, 2005, ACM, pp. 66-77.*

* cited by examiner

Encryption: Different data, same key

Encryption: Similar data same key

Encryption: Similar data same key, key seeded with random number

METHOD AND DEVICE FOR ENCRYPTION/DECRYPTION OF DATA ON MASS STORAGE DEVICE

FIELD OF THE INVENTION

The present invention relates to a method and a device for secure encryption (enciphering), scrambling, decryption (deciphering) and de-scrambling of data, and more specifically, to a method and a device for secure encryption and decryption of data when writing to or reading from a mass storage device, such as a disk unit, tape unit or other electronic/mechanic/optical mass storage media (called mass storage), connected to a computer or other electronic equipment such as digital camera, digital sound/video recorders (called computer systems), by a mass storage bus.

BACKGROUND OF THE INVENTION

Computer systems store programs and data in mass storage devices. Unauthorized access to such stored data is a known and increasing threat. The usual method for protecting such stored information is by demanding a username and a password from a user of the computer system thereby avoiding unauthorized access to the data.

Few are aware of that an unauthorized person may gain access to any portion of information stored on a mass storage device without the standard user identification method; an unauthorized person can remove the storage device from the computer (on some systems with external mass storage units, this is extremely easy), insert the storage device into another computer system and read/use the information stored on the mass storage unit and even modify data if wanted (fraud). Theft of mass storage data is a substantial increasing threat.

It is known to secure information by encryption before it is stored on a mass storage media. Encrypted files or data segments must be decrypted before they can be used. When data is written back to the storage unit, the data must be re-encrypted. This process involves extra procedure handling for the user, and is often the reason why such precautions are rarely effective in use.

Most computer operating systems are also constructed to use work files (swap files, temporary files) of information currently processed. Sensitive data can remain available in the work files. Even if the user thinks that the job is done, and data are written encrypted and safe to a disk, a person skilled in the art will be able to extract data and documents from the work files.

Even when these working copies are deleted, they are still recoverable, since deletion normally will only mark an area on the mass storage media as free for use and not erasing the data. To be sure that data is erased, the media has to be written over and over again with random data to be sure that no information is available on the deleted part of the mass storage media. This procedure is storage media sensitive. The example above is typical for a magnetic type of media, and will be different for an electronic/mechanic/optical media; you cannot write too many times back to a flash media, since the writing will shorten the media life time dramatically.

These procedures involve a large amount of computer processing and use of specifically designed software.

Using software encryption programs will expose the allocated encryption keys when they are processed. Unauthorized persons, virus programs, spy programs etc., may use these exposed keys to decrypt stored data.

To avoid some of the mentioned shortcomings above of securing mass storage data, it is known that it is possible to encrypt all stored data on a mass storage device and decrypt all data read from such a mass storage device.

One advantage of this scheme is that all data on a mass storage device is always encrypted. This is achieved by providing a dedicated program to be executed handling the data stream to and from the mass storage device.

The aforementioned program however, cannot be stored encrypted because the computer system must be able to read and start executing the program in order to be able to decrypt information stored on a mass storage device. If all information stored in the mass storage device is to be encrypted, the program must be stored in a second storage device without encrypting the data stored thereon. Another obvious drawback in such a system is the demand for computer resources by the encryption/decryption process, leaving a lot less processor resources for the user of the computer system, and the encryption keys will still be exposed when they are used.

U.S. Pat. No. 5,513,262 (van Rumpt et. Al.), discloses an electronic device for enciphering and deciphering data sent to and from a mass storage device in a computer system by inserting the electronic device in the bus connecting the computer system and the mass storage device.

The connecting bus passes command codes, for example for a hard disk drive controller. The commands will be recognized by the electronic device and it will let pass the commands unchanged, while data is enciphered/deciphered on the fly when they passes the bus to and from the mass storage device through the electronic device.

Enciphering/deciphering are achieved by applying encryption/decryption algorithms (DES) and an encryption/decryption key on the data stream passing through the electronic device. The disclosure does however, not teach how to get the key into the enciphering/deciphering device in a safe manner.

One possible solution is a key hard coded into the unit, but a replaceable key is more attractive, if for example a used key accidentally is disclosed. The manufacture of the encryption/decryption device must also keep track of all used codes, if for example a used electronic device collapses, it must be replaced to gain access to the stored data. Therefore there must exist an index linking hard coded keys to specific devices, which in itself represents a security risk.

Replacing the key would imply transferring the key from a computer system to the electronic device over the interconnecting bus between the computer and the mass storage device, which means involving the central processor unit in the computer system. Malicious software, planted in the computer system, such as a virus, worm or Trojan code, may hijack the key when transferred and the encryption may be compromised.

UK patent application number GB 2,264,374 (Nolan) discloses another device to be inserted between a host computer and a mass storage device. Data flows between several data buffers, which may be acceptable for a low speed tape recording system, but the structure of the device cannot serve a modern high-speed hard disk drive. Moreover, the encryption/decryption depends on the data block organisation in the storage, which make the encryption/decryption device computer system dependent. However, the patent discloses a separate terminal where an operator can enter encryption/decryption keys directly to the encryption/decryption device without involving the central processing unit in the computer system. Even when using a separate channel supplying keys from a separate key storage media, like a smart card, the data stream may be compromised and/or manipulated.

One major drawback in the prior art is that all methods known so far utilise one algorithm and one key for the whole content on the storage media. Equal data sets will be encrypted with the same pattern that can be used to crack the key and the encryption method used. A simple example illustrating this scenario would be that the English word "is" would be encrypted to for example "ce". By recognising that "is" is a very frequent phrase in an English text, and that this two-letter combination quite often is the second phrase in a sentence, this observation and pattern may help to crack the code that is used.

SUMMARY OF THE INVENTION

The present invention, as claimed in the attached patent claims and the present examples of embodiments of the invention, provides an improved method and device for enabling storage and retrieval of encrypted/decrypted data to/from a mass storage media in a computer system or similar system environment.

The present invention is providing a method and a device that can encrypt and decrypt data located in addressable areas on a mass storage media with one of a plurality of encryption/decryption algorithms and keys, where the selection of the current algorithm and key used on the current data item within the addressable area, is based on the physical addresses of lower and upper address limits that said addressable area on the mass storage media.

The arrangement of a device according to an embodiment of the present invention can be used to encrypt/decrypt e-mails or other types of electronic messages on the fly. The key and the associated encryption algorithm can be a system that provides a public key and a private key. In this manner persons communicating with e-mails can establish a secure channel for messages with their own private keys and by exchanging information on which public key and algorithm the message has been encrypted with.

In a preferred embodiment of the present invention, a method and device is provided that allows different operating systems to be totally independent and isolated, even when stored on the same mass storage media, and loaded into a computer system only when a correct key is inserted in a device according to the present invention for that operating environment. In one embodiment of the invention, a user/administrator of a computer system will have his own key stored encrypted on a key carrier that transfers the key to the encryption/decryption device on a secure channel. This arrangement allows the user/administrator access to own data files and permitted operating environment. When such a key is removed from the device, the possible action performed, according to a preferred embodiment of the invention, can be one of the following: shutting down the computer, just stopping executing programs in the computer, stopping executing programs after a predefined time period or just leaving the computer running until the computer system is rebooted. At this point, the key would be required when the booting starts again. The method and device according to this particular embodiment of the invention provides a substantial improvement of data security in a computer server system over prior art.

An aspect of the present invention is to provide a secure and tamper free method and device for providing a key to an encryption/decryption algorithm running in an embodiment of the invention.

DISCLOSURE OF THE INVENTION

A mass storage device is connected to a computer system by a mass storage bus (such as cable, copper or fibre etc.) that provides the transfer of data, control codes and status codes between the mass storage device and the computer system.

There are several types of such bus systems and protocols used for this purpose. Examples are SCSI, IDE, AT, ATA, USB, FireWire, FiberChannel and others. These bus types are well known for a person skilled in the art.

The present invention can use one or more of these bus protocols.

Figure 1:
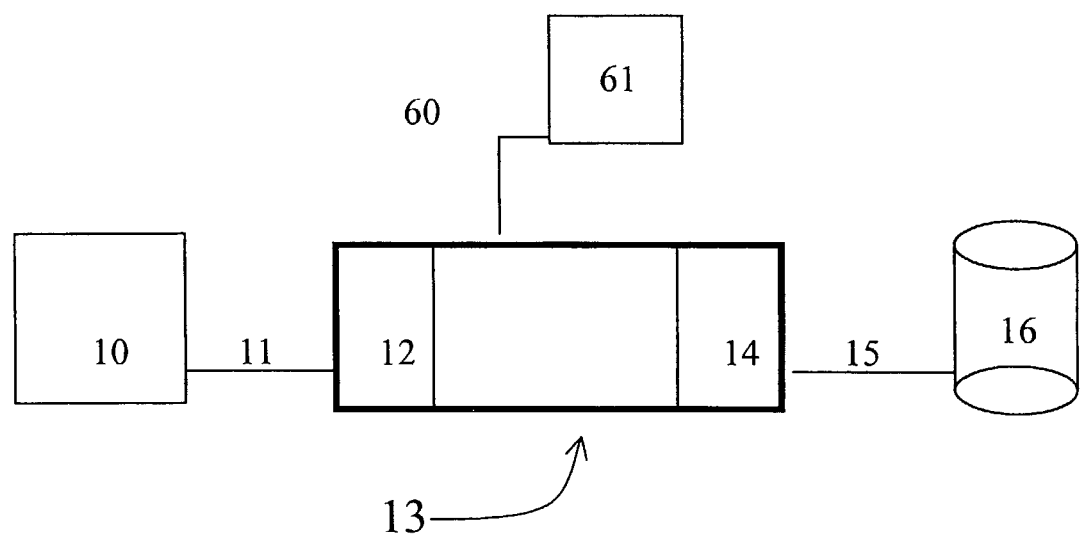
FIG. 1 depicts a schematic view of an example of an embodiment of the present invention.

An electronic device 13, according to an embodiment of the invention, is shown in FIG. 1. A mass storage device is communicating with a computer through the device 13 that provides a first end 12 communicating with the computer 10 via the bus segment 11, and a second end 14 communicating with a mass storage bus device 16 via the bus segment 15. The bus segment 15 is typically using a standard mass storage bus protocol as known to a person skilled in the art. The bus segment 11 can use the same protocol as the segment 15, but can be different, for example a serial bus while the segment 15 is a parallel bus. The device 13 will anyhow receive data or transmit data to and from the both ends linking the computer system 10 with the mass storage device 16. Data sent from the computer system 10 via segment 11 is encrypted on the fly in the device 13, while data sent from the mass storage device 16 via the segment 15 to the computer system 10 is decrypted on the fly in the same device 13. In an embodiment of the present invention, where the segment 11 and the segment 15 utilises different bus protocols, the device 13 also serves as a translator between the two protocols while, on the same time, providing encryption/decryption of user data on the fly.

Figure 3:
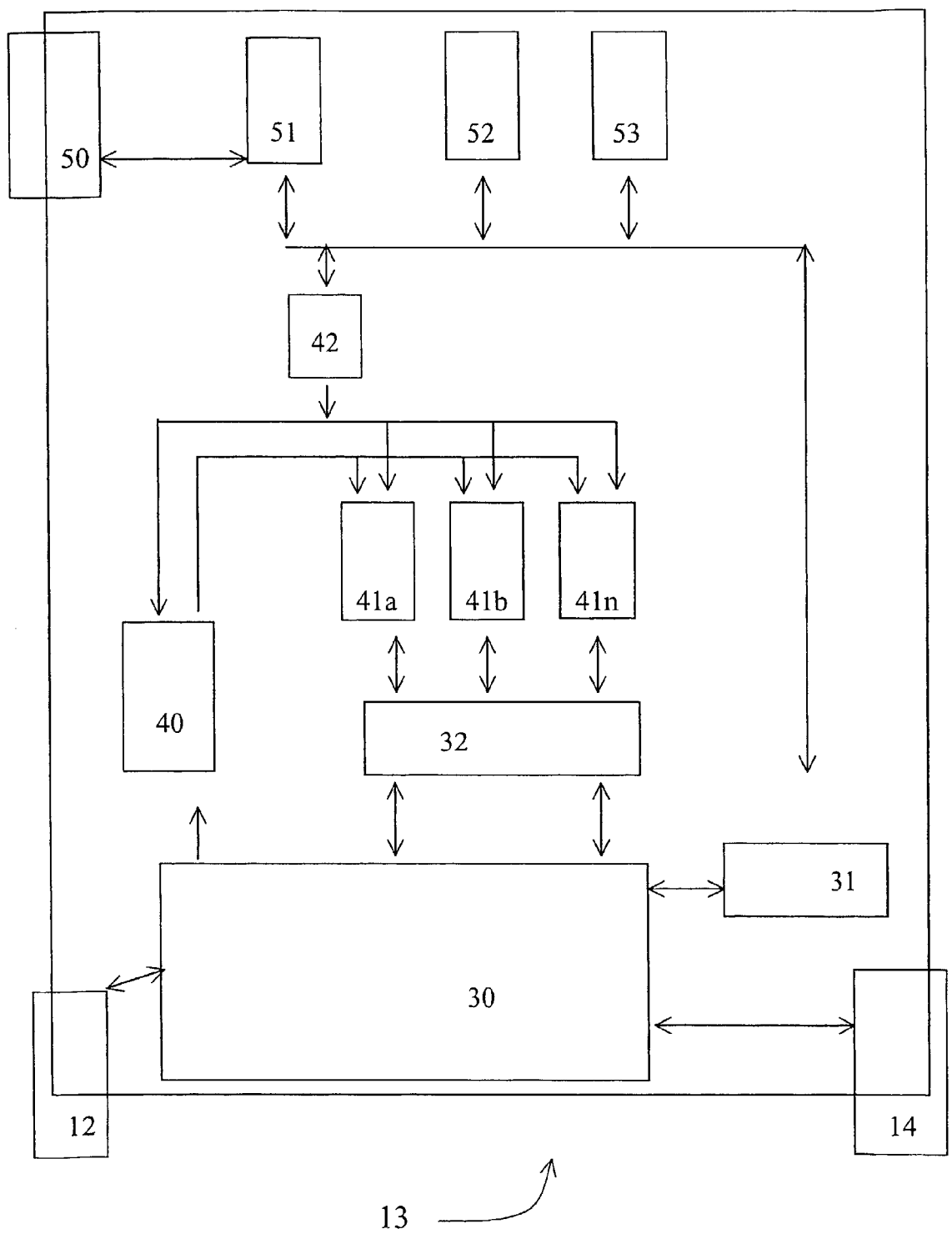
FIG. 3 depicts a schematic layout and interconnections of functional units in an electronic device according to a preferred embodiment of the present invention.

According to the present invention, the device 13 can be arranged in different ways. For example, the functional units as depicted in FIG. 3 can be arranged as an integral part of a hard disk controller. In this case the bus segment 11 is typically a mass storage bus. The bus 15 will typically be an internal bus definition connecting directly to the hard disk driver system.

In yet another example of embodiment of the present invention, the device 13 will be a circuit designed to be part of a motherboard of the computer system. Typically, the bus segment 11 will be implemented according to an internal bus definition of the motherboard, or will be tailored to communicate with a programmable input/output device on the motherboard, for example a Direct Memory Access channel. The bus segment 15 will be a mass storage bus.

Data transferred between the computer system and the mass storage device can be divided in two categories: Command/Control codes and user data. Command/Control codes are all information regarding command/control of the mass storage device, including status codes, formatting codes and codes that specifies data organisation of the mass storage media, which operation to perform, which location to use on the media etc.

Command/Control codes are read via the first end 12 of the device 13 from the bus 11, and then written by the device 13 to the second side 14 onto the bus 15 without encryption or decryption (there can, however, be performed an alteration in some cases). The mass storage device controller will act on these Commands/Controls according the manufacture specifications of the mass storage device. This arrangement of selectively identifying Commands/Codes or data, are used to send extended Control/Codes that acts on the device 13 to select encryption keys, algorithms and other operational functions and features inside the device 13.

The scheme on how to recognize such Command/Control codes is usually specified in the mass storage bus protocol.

In some mass storage bus protocols, however, it will not be possible to extend the Command/Control codes to achieve actions in the device 13. In another example of an embodiment of the present invention, it is possible to "borrow" some blocks of data on an unused area on the mass storage media, typically an area outside the storage device limit (hidden area). The device 13 can use such an area as a communication window to the computer, and it can be used in the same manner, as known to a person skilled in the art, as when the Command/Control codes where extended. The computer system and the device 13 can read and write messages (commands, instructions, data etc.) to each other through this window.

Referring now to FIG. 3, user data are the data to be stored on the mass storage media. Encryption and decryption is performed by sending user data as input to well documented encryption algorithms such as DES, AES etc. The encryption/decryption device 13, according to the present invention, has an internal crypto bus 32 that connects different hardware sections 41a, 41b, 41n in the device 13 running specific algorithms each attached to the user data input flow, flowing to and from the first end 12 and the second end 14 via internal buses inside the device 13 and under supervision of the device controlling part 30. For a person skilled in the art, it is readily understood that 41a, 41b, 41n may implement any one of a known algorithm, for example in a hard wired processor arrangement for each algorithm, for maximum speed considerations, but also specially developed solutions for specific demands such as military use, satellite communication links etc. (for example scrambling algorithms) can be implemented. In yet another embodiment of the invention, the algorithms can be executed in a micro controller arrangement, where the action of selecting a specific algorithm, is by loading different program counter content in the micro controller. Each of said program counter contents corresponds to the start address of each algorithm stored in a common program memory. The program memory can be a fixed non-volatile memory or a random access memory initialised at power up time from the computer system 10 for example. Such transfers can also be encrypted and/or be subject to rigid authentication procedures as known to a person skilled in the art.

Large mass storage devices need to organise data to be manageable by a computer system and provide a functional file system for a user or an application program. The basic formatting is a block/sector division of a media. Generally it is necessary to have addressable areas with sub addressable units within the area on a mass storage media to constitute functional mass storage solutions such as file systems. An addressable area on a mass storage media is usually a consecutive physically addressable area of the media, limited by a lower and upper address defining the span of the addressable area. Mass storage systems are usually arranged in a hierarchy of logic layers defining different types of for example storage areas and systems. An example is the RAID disk system definitions. An address to such an area is usually referred to as a logic address. In the present invention will all references be to the lowest level of address—the physical address on the media. The embodiments of the present invention can be used with all kinds of logical storage layers and systems on top of the physical media.

Figure 7:
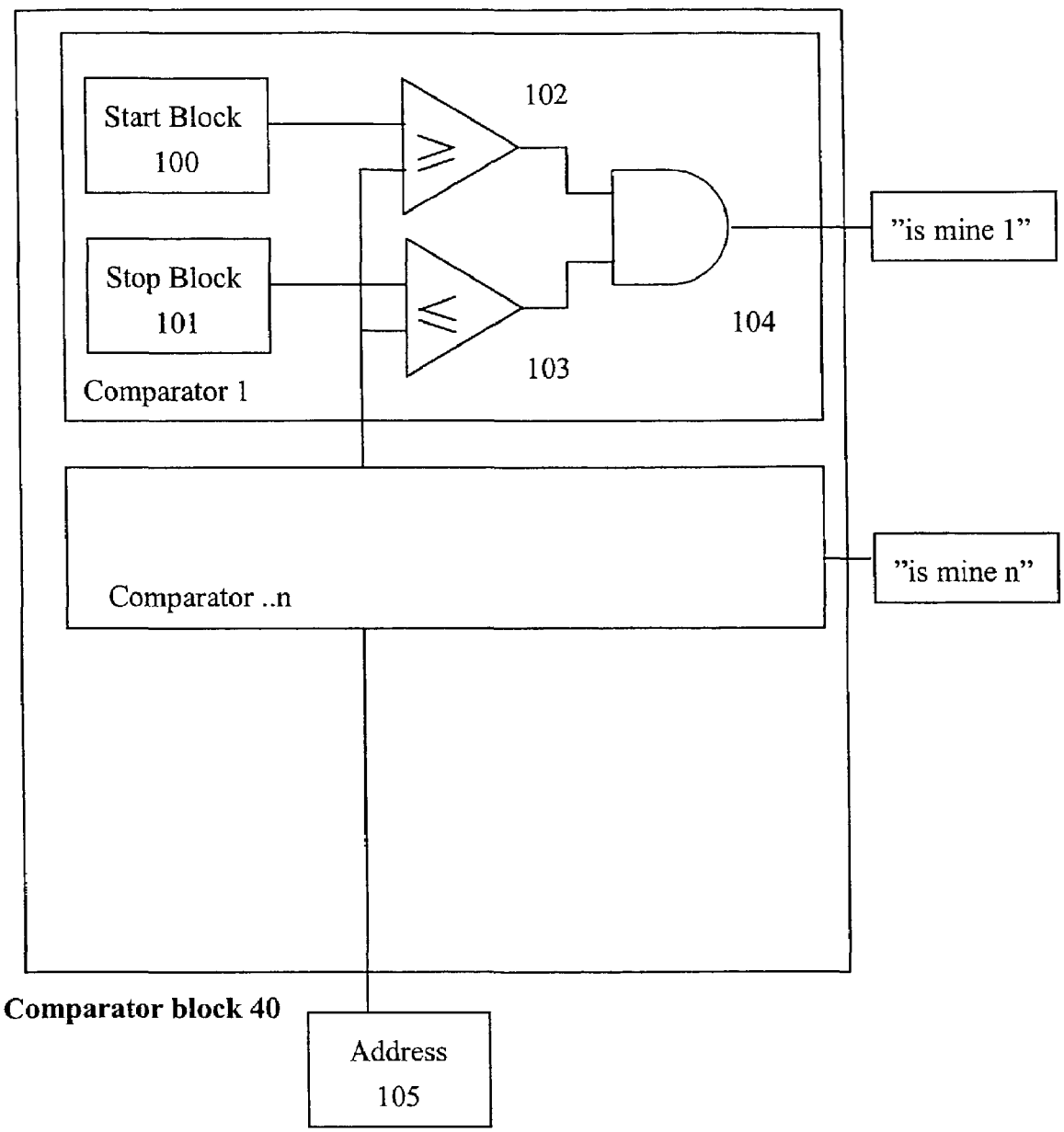
FIG. 7 depicts a schematic view of the comparator system according to the embodiment of the invention depicted in FIG. 3.

According to a preferred embodiment of the present invention, such addressable areas (blocks/sectors) can be individually encrypted with its own encryption key and/or algorithm. The block 40 in the device 13 receives the address of an area such as a block/sector number and selects one of the algorithms to be run in the sections 41a, 41b, . . . , 41n on basis of a comparison of this number with the address (sub address within the area) associated with a data item to be stored or read from the mass storage device 16. FIG. 7 illustrates the comparator block 40. The start address and end address of a block of data (the limits of an addressable area on the media) is stored in the comparator 40 as "Start Block" and "Stop Block", respectively. When the address of a user data item (sub address within the area) is received, the user data item address is compared with the aforementioned "Start Block" and "Stop Block" addresses. If the user data item address is greater than or equal to the "Start Block" address and the user data item address is less or equal to the "Stop Block, a Boolean operation AND in the comparator 40 detects this condition, and sends out a "is mine" signal to one of the algorithm sections 41a, 41b, . . . , 41n that this particular "is mine" signal is connected to enabling the algorithm when true. Otherwise, the signal is false, inhibiting running the aforementioned algorithm.

In an embodiment of the invention, will all the hard wired processor algorithm sections 41a, 41b, . . . , 41n contain a memory area with the same number of memory cells as there are algorithm sections. The linking of an "is mine" signal to a specific algorithm section will then be accomplished by entering logic 1 in the cell with an address equal to the number of the algorithm section, otherwise zero. By combining each "is mine" signal from each comparator with all the cells with corresponding address as the number of the "is mine" signal, will the selection of an algorithm be interchangeable programmable.

In an embodiment of the algorithm sections by a micro controller, can associating correct content of the program counter with the associated "is mine" signal do the selection and interchangeable programming.

The comparison arrangement is repeated n times in the comparator block 40, one for each of the n sections running an algorithm.

Figure 4:
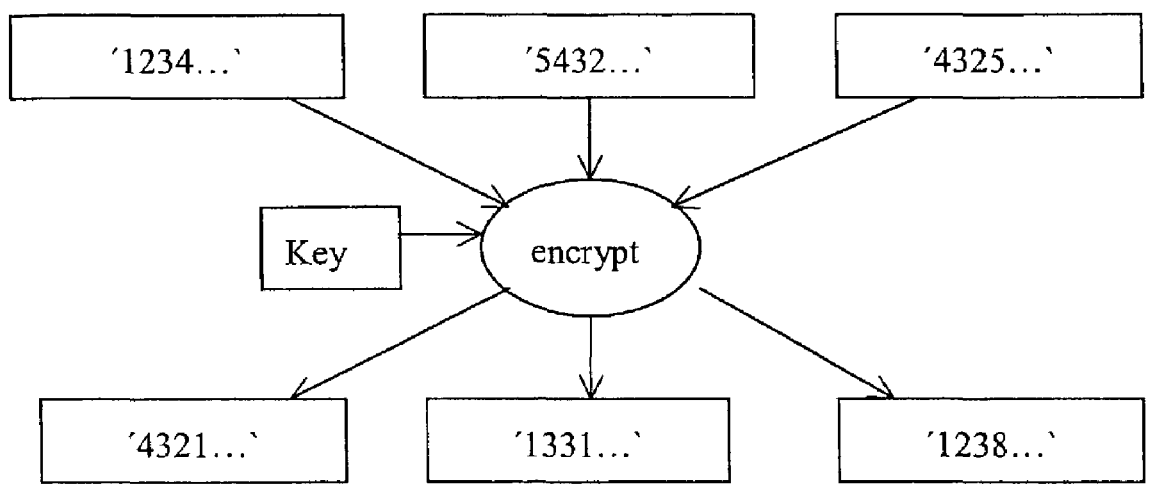
FIG. 4 is an illustration of an encryption process according to an example of an embodiment of the present invention.

FIG. 4 illustrates an example of encryption of data elements (blocks/sectors or addressable areas) where data are different, but the same key is used.

Figure 5:
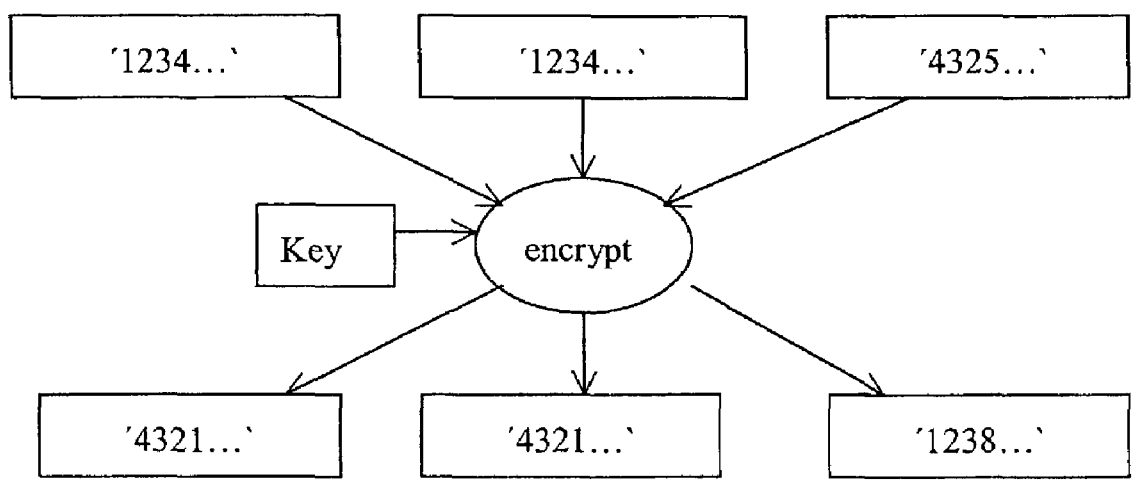
FIG. 5 is an illustration of an encryption process according to an example of an embodiment of the present invention.

FIG. 5 illustrates the same encryption scheme as in FIG. 4, but in this example two of the data elements are the same and the same key is used. The encrypted data elements will therefore be the same constituting a pattern that may be a security risk.

Figure 6:
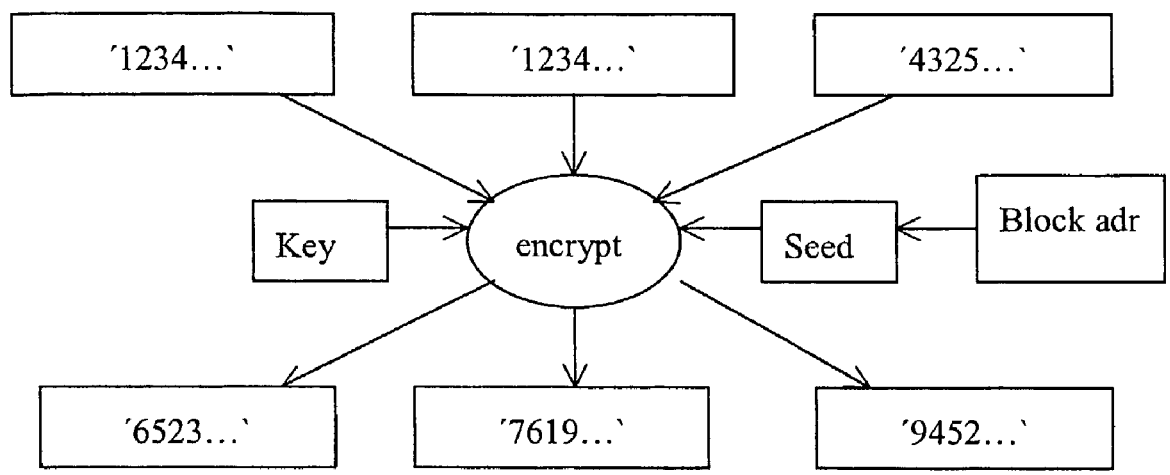
FIG. 6 is an illustration of a preferred embodiment of an encryption process according to the present invention.

In a preferred embodiment of the present invention, the block/sector number information in a Command/Control code, or information about an addressable area given in a command for that particular addressable area, is used to select a key, together with an optionally generated number unique for this block/sector/addressable area (a combination of block/sector/addressable area number and a random generated table, where the combination can be constituted as a concatenation if the key is symbols for example, addition or subtraction etc. if the key is a number etc.). This scheme is illustrated in FIG. 6.

The optionally generated number is used to prevent that two identical blocks (or sequences of data) of data will be encrypted identical, as shown in FIG. 5. The random numbers are generated and stored in a table inside the device 13 addressed by the block/sector/addressable area number. In an embodiment of the present invention, there can be a plurality of tables that are addressed in two steps, first by the selection signal "is mine" generated in the comparator 40 and in the second step the block/sector/addressable area number. This arrangement provides the same random number for the same block/sector/addressable area number thereby ensuring correct encryption/decryption of the same data elements, while at the same time providing completely random patterns in the encrypted flow of data, even if the same data elements appears and keys are used, as illustrated in FIG. 6. The content of the table can be generated internally in the device 13 in a micro controller 51.

Referring now to FIG. 3, to write a data block (sequence of data) to a disk, the computer has to tell the disk controller where to write the data via a block/sector number. The encryption/decryption device will receive the command with the block/sector/addressable area number via the part 12 of the device 13. The protocol interpreting part 30 of the device 13 will recognize this as a command and feed it through its interior data path to the part 14 of the device 13. The protocol part 30 will also store this information and feed it to the comparators 40 inside the device 13 as described above ("Start Block" and "Stop Block" addresses, address of an user data item, etc.).

When the computer sends the write command, the protocol part 30 will send the write command to the part 14, and set the protocol part 30 ready to do data transfers. Then, the computer starts sending data. The protocol part 30 will collect data from the part 12 via the bus 11, sizing them into 32 bits (which is the size of the internal crypto bus 32, but not limited to this size), and passing the data to the crypto bus 32. The comparator 40 enables the correct algorithm section and associated key and lets the data, on the crypto bus 32, go through the correct algorithm section 41a, 41b, . . . , and 41n.

When data is read from the mass storage device 16, the computer sends a read command, and the protocol part 30 will arrange the data flow such that the data is read form the mass storage device to the computer via the correct decryption function inside the device 13 in a similar manner as described above.

When the read/write data traffic starts, the comparator section 40, which contains the set of comparators describing addressable areas on the mass storage media that are encrypted with different algorithms ("Start Block" and "Stop Block" addresses), will send the output signal "is mine" that corresponds to the current sector thereby selecting correct algorithm section 41a, 41b, . . . , 41n and associated key.

The encryption/decryption algorithms, 41a, 41b, . . . , or 41n, will start collecting data arranging them to the bit size the algorithm use. When the correct number of bits is collected, data will be sent through the current algorithm section 41a, 41b, . . . , 41n selected by the comparator 40. After encryption/decryption, data will be split into the crypto bus bit size and sent from the output of the current algorithm 41a, 41b, . . . , 41n back to the crypto bus 32 down to the protocol part 30, that split the data to the bit size of the bus 15 or 11, and sending the data to either the computer 10 (decryption) or to the mass storage device 16 (encryption). The encryption sections 41a, 41b, . . . , 41n also gets information from the comparator when a new data block starts, to be able to use CBC or other encoding functions to extend security.

The protocol part 30 issues also all the necessary "hand shake" signals being part of the bus segments 11 and 15.

The method and device according to the present invention is not limited as described to a certain encryption/decryption algorithm. The sections 41a, 41b, . . . , 41n can all implement any type of algorithm or scrambling of data. In a preferred embodiment of the present invention, each section 41a, 41b, . . . , 41n will have storage "slots" for an associated key with that particular algorithm.

Figure 2:
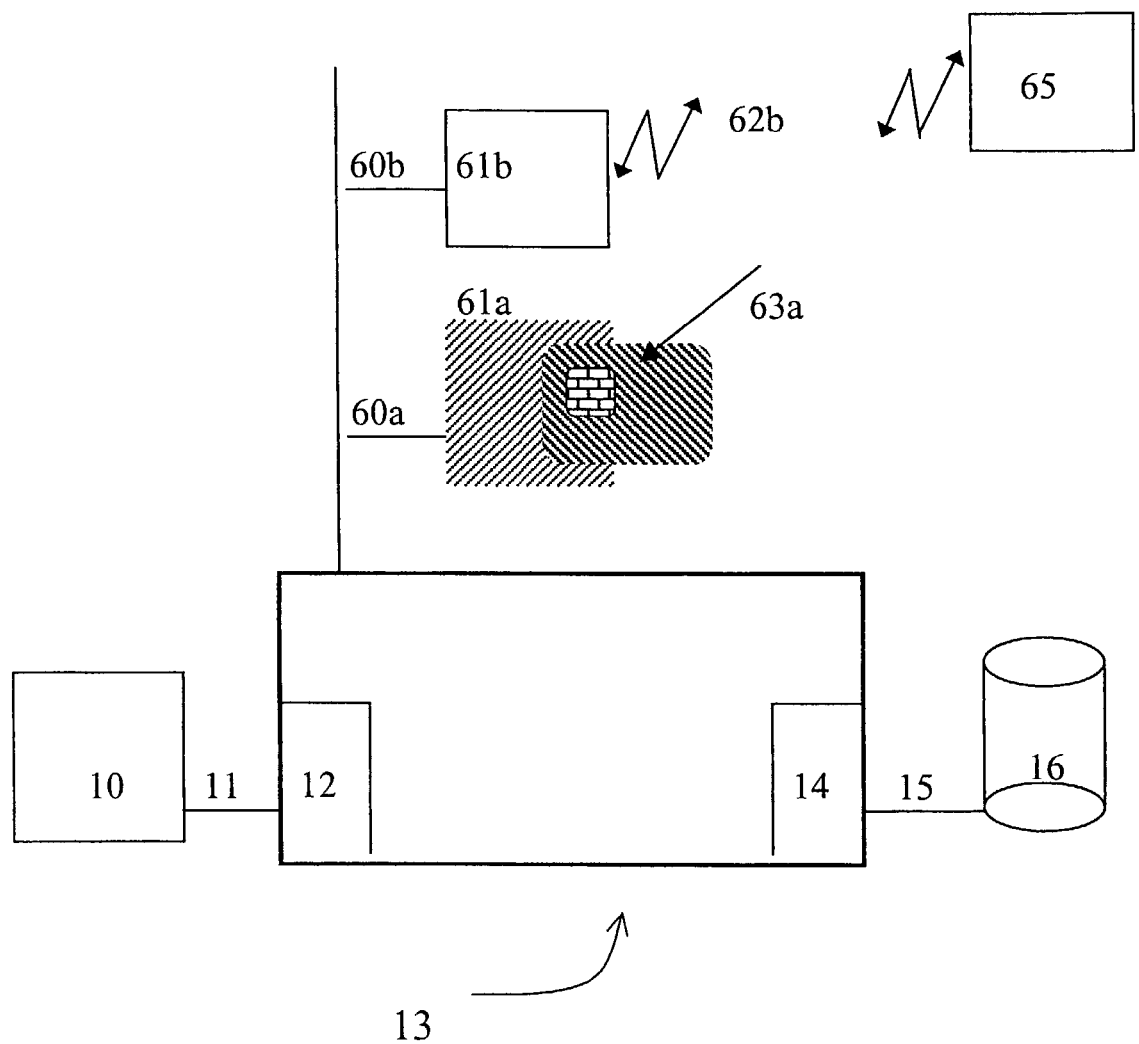
FIG. 2 depicts a schematic view of a secure channel transferring an encryption/decryption key from a smart card, or other type of carrier of the key, to a device according to the present invention

In a best mode embodiment of the invention, a device as depicted in FIG. 1 and FIG. 2 is implemented where the keys are interchangeably and replaceable arranged in each section 41a, 41b, 41n in memory allocations, selected by the comparator system depicted in FIG. 7 when the signal "is mine" selects a section 41a, 41b, . . . , 41n running the current algorithm selected by the comparator 40.

Initialising the encryption/decryption system according to the preferred embodiment of the invention includes providing a start block address, a stop block address, a key and an indicator of which algorithm section 41a, 41b, . . . , 41n to use for the different blocks/sector or addressable portion of a storage media. FIG. 2 depicts a system with a smart card reader 61a for reading a smart card 63a (key carrier) containing the start block address, stop block address, key and algorithm indicator. Other means for providing this information to the device 13, such as an infrared communication link or radio link 62b etc., can be used according to the invention.

When the device 13 is started, the internal micro controller 51 will collect keys from the key carrier 63a. The micro controller will send keys to the correct encryption section via a security section 42. The security section will prevent keys to be destroyed if the micro controller 51 should start running malfunctioning code. The micro controller will also load the comparator values.

The internal ram 31 (random access memory) is arranged the same way as an addressable portion of a mass storage device. That is, all the common features of the device 13 in accordance with the present invention can be applied on the content of the ram.

To use this functionality, extended codes as described above, can be utilised to transfer a block of data to and from the ram 31 either to/from the computer system 10 via the bus segment 11 or to/from the mass storage device 16 via the bus segment 15. Another method of accessing the ram 31, is to use it as a memory location outside the disk boundary, and thereby accessing the memory as if it was part of the disk system, although hidden. These actions are controlled by the protocol part 30.

One action the ram 31 can do is to send an interrupt to the internal micro controller 51, when for instance the ram 31 is full. The micro controller 51 can then read data from the ram 31 and do processing on the data. The micro controller can also write to the ram 31. The computer system 10 can also read data from the ram 31. By building an easy communication protocol, the computer can communicate with the micro controller 51. In a preferred embodiment of the present invention, such a protocol is implemented, and also a protocol where the micro controller 51 can relay this information to the key carrier 63, 65. In this manner, we have a communication channel both to the micro controller and to the key carrier 63, 65 via the computer system 10, and directly internally inside the device 13. These communication cannels are used to load keys to the key carrier 63, 65 as well as loading keys to the algorithm sections 41 a, 41b, ..., 41n.

Whichever implementation, the ram 31 can be utilised in several useful applications. In one embodiment of the present invention, the ram is used to load e-mails or other types of electronic data such as files, network traffic etc. to the ram 31, encrypt the content of the ram in one selected section 41a, 41b, ..., 41n, and then read the encrypted data back to the computer system 10 where further actions on the data will be executed. If the length of the data exceeds the size of the ram 31, the communication protocol will split the data and then loop the different sections of the data through the process as described above until the end of the data.

When an encrypted e-mail or other types of data has to be decrypted for instance, the user of the computer system 10 has to load the e-mail or data to the ram 31. Then the device 13 runs the proper algorithm and the decrypted e-mail is transferred back to the computer system 10. Keys for this operation can be public/private key systems providing a secure system where the keys never are exposed when they are transferred encrypted, according to the invention, to the device 13 as described in the present disclosure.

One important aspect of the present invention, is to provide a secure handling of encryption keys. In a preferred embodiment of the invention, a key is first transferred to the micro controller from the computer system 10. Then the device 13 can perform a selected encryption of the key, and then the micro controller 51 can transfer and load the encrypted key to the key carrier 63, 65, for example a smart card. In this simple manner the method and device according to the present invention provide a secure channel and transfer of encrypted encryption keys used in the system.

One important aspect of the present invention is to use keys encrypted on key carriers such as smart cards. The key carrier technology permits to "hide" data content inside the carrier. This feature heightens the security of a key. An even more important aspect of key carrier technology is that it is possible to let the key carrier in itself generate a random encryption key for a session. In this manner the whole key process will proceed without intervention of any human actions thereby increasing the security of the keys even further.

The key carrier 63, 65, carrying the keys, are directly connected via the communication channel 60 to the device 13. The key device interface 61 can be a dedicated smart card reader for example. For other types of key carriers, it can be an IR transceiver, radio transceiver, or other similar device.

The keys are stored in external devices 65 or 63. There are also methods for storing key data internal in the device 13, in non-volatile memory 52, 53 where the user has to use authentication procedures to enable these keys (this is a procedure that can be done together with other security products).

The present invention protects the loading of external keys by encrypting data to/from the key carrier 63, 65. According to the present invention, after detection of a key carrier 63, 65, the device 13 will send a public key to the key carrier 63, 65. The key carrier 63, 65 will then encrypt, with the public key, a session key to the device 13, then the device 13 and the key carrier 63, 65 can start to communicate. An alternative way is to use a key exchange scheme (for example Diffie-Hellman key exchange) to define session keys. The session key will encrypt all data on the communication channel 60. The invention will send check messages to the key carrier 63, 65 to ensure that the key carrier 63, 65 and key device interface 61 is still on-line. This check messages will be sent at random time intervals with enough data to be sure that the key device interface 61 and key carrier 63, 65, and the device 13 can authenticate each other. If the key carrier 63, 65 detects irregularities, it will be shut down. If the device 13 detects irregularities, it will be shut down. One exception to this scheme is that the keys can have a lifetime parameter. This parameter tells the device 13 how long time period the keys shall "live" in the device 13 after a key is removed. If the key is removed, according to the present invention, the device 13 will not shut down the key before the lifetime has reached the predefined time period. All other detectable "tampering" with the key or the key device interface 61, will cause the device 13 to shut down all keys. Shut down, means, that keys are detectably removed from the device 13, and the device 13 will no longer gain access to the protected area defined by the key.

Figure 8:
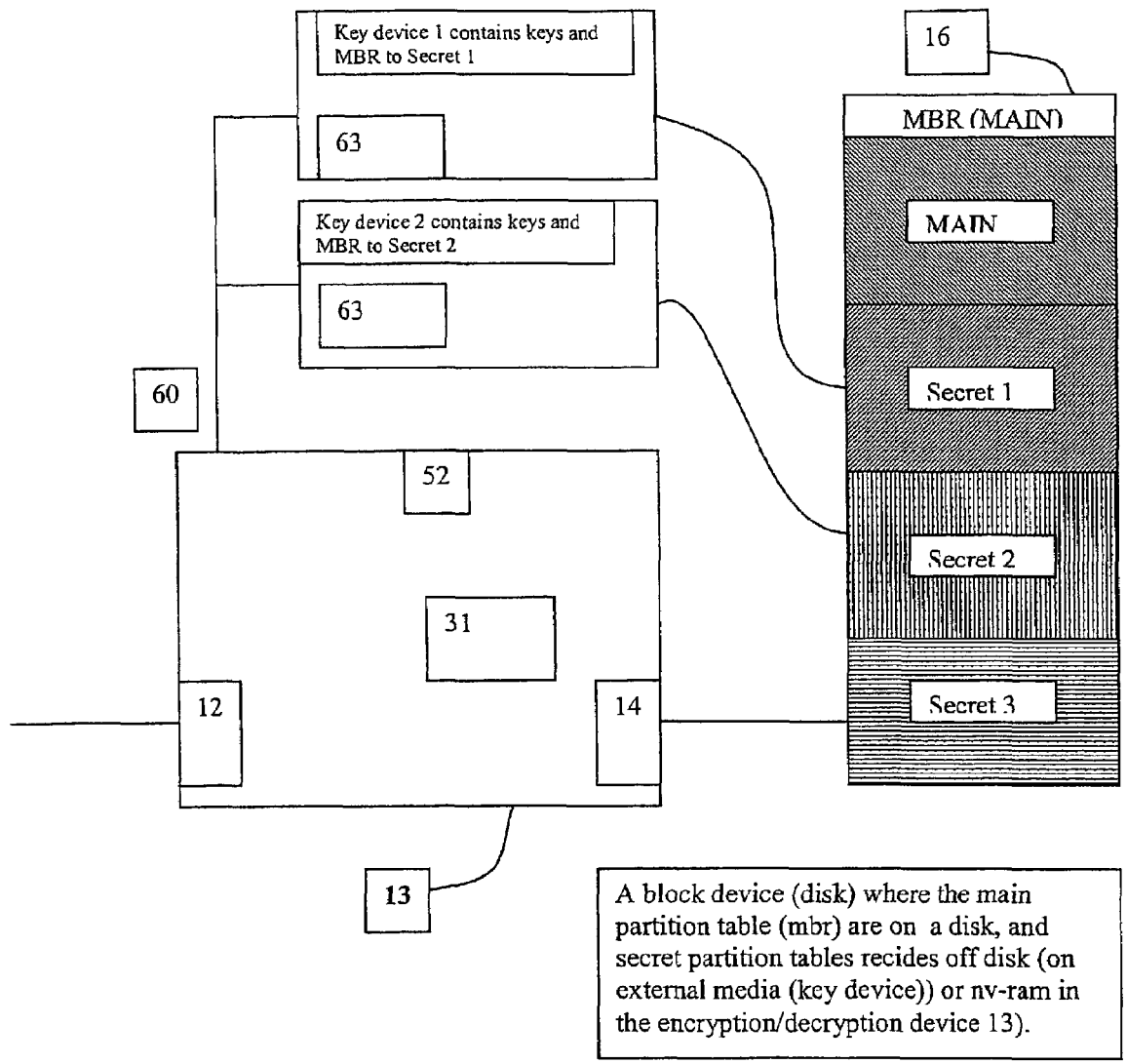
FIG. 8 depicts a system, according to the present invention, where the master boot record of a disk system is interchangeable.

Referring now to FIG. 8 the present invention can also execute a data intercept function; it means it can tag a sector/block, and store the content internally in the ram 31, then the content can be modified or changed, and then sent to the host computer system 10. With this function we can alter partition tables on a disk system, change partition tables to match a key set; e.g. different key set can boot the system with different operating systems. One key unit can start operating system 1, another key unit can start operating system 2, where operating system 1 and 2 are isolated from each other on the hard disk drive.

This is a useful function in home office computers, and other computers where more than one user needs exclusive access and protection of data.

As shown in FIG. 8 a hard disk device 16 can be split in several independent isolated areas of storage. A MBR (Master Boot Record) contains the necessary information a computer system first is loading when a system is booted. The content of the MBR tells the computer system where and how to load the operating system from the hard disk drive. The MBR for different operating systems on the same hard disk drive can be stored together with an encryption key in for example a smart card, in accordance with an embodiment of the invention. As described above, the MBR on the smart card can be loaded to the ram 31, be decrypted and then be used as the MBR of the hard disk drive 16 connected to the device 13.

The present invention provides also a 2-step boot method of a computer system. First, send a program code segment (stored in the device 13 in the non volatile memory 52, or in a key carrier, such as a smart card) to the host computer system 10 that gives the user/administrator a method for authentication. Secondly, after the authentication has been successful, download the master boot sector from the hard disk drive to the computer.

The present invention increases the security of a mass storage device by providing a method and device for encryption/decryption of data stored on addressable portions of a mass storage media with different algorithms and encryption/decryption keys.

One aspect of the present invention is to provide one key and one algorithm for a particular addressable portion of the storage media.

Yet another aspect of the present invention is to provide an increased security when encrypting a such addressable portion of a storage media with that particular key and algorithm by providing a random number together with the key for randomisation of the patterns constituted on the media after encryption, even if successive data records are alike and encrypted with the same key and algorithm. The random numbers are stored in a table permitting recovery of a particular random number used when decrypting the data encrypted with this random number selected by the information about the block/sector number or address of the addressable part of the media.

The present invention provides also a system for securing the downloading of a particular operating system and operating environment from a hard disk drive to a computer system which also enables complete physical and logical isolation between data files for the different operating systems and users of the computer system. The present invention provides an encryption/decryption method and device that prevents access to data on a server hard disk, when for instance the disk system on the server is stolen or removed and transferred to another computer system.

One other aspect of the present invention is to provide an encrypted communication channel for transferring keys between carriers of keys and a device according to the present invention.

The invention claimed is:

1. Method for encryption (enciphering, scrambling) /decryption (deciphering, descrambling) of a data stream transferred to or from a mass storage media, wherein the data stream comprises a plurality of data items, each respective data item has a unique associated physical address comprised in the data stream that defines the location on the mass storage media the respective associated data item can be stored or retrieved from, wherein the method comprises the steps of:
   providing a division of the mass storage media into a plurality of segments, each respective segment comprising consecutively physically addressable readable/writable storage locations, wherein each respective segment is bounded by lower physical address and an upper physical address of the mass storage media, each of the respective lower physical addresses and the upper physical addresses is part of each of the respective segments;
   associating a plurality of encryption/decryption algorithms with each respective segment of the plurality of segments dividing the mass storage media, wherein a same one of the plurality of the encryption/decryption algorithms can be associated with different ones of the segments;
   associating a plurality of encryption/decryption keys with each respective segment of the plurality of segments dividing the mass storage media;
   when the data stream streams towards the mass storage media,
      comparing the physical address of each respective associated data item with the respective upper physical address and the respective lower physical address bounding each respective segment dividing the mass storage media, to identify which bounded segment the associated physical address falls within, and
      using the identified segment to select the associated encryption algorithm of the segment and the corresponding associated encryption key, to encrypt the data item before storing the data item on the mass storage media on the address defined by the associated physical address; and
   when the data stream streams from the mass storage media,
      comparing the physical address of each respective associated data item with the respective upper physical address and the respective lower physical address bounding each respective segment dividing the mass storage media, to identify which bounded segment the physical address falls within, and
      using the identified segment to select the associated decryption algorithm, and the corresponding associated decryption key, to decrypt the data item before transferring the data item form the mass storage device.

2. Method according to claim 1, wherein the step of selecting the encryption/decryption algorithm with associated key, further comprises the step of combining said key with a randomly generated number, by concatenation, subtraction or addition or combination of these operations or any other arithmetic or logic operation on the two items constituting said random number and maid key.

3. Method according to claim 2, wherein,
   said random number is taken from a table, and
   an address of maid table is an index constituted by at least a part of said address of said data item.

4. Method according to claim 3, wherein random generated numbers for combining with said key are stored in said table where the address of said table is based on two physical addresses within said selected span of addressable area on said media.

5. Method according to claim 4, wherein at least parts of the content of said table storing said randomly generated numbers is statically or dynamically replaceable stored in said table.

6. Method according to claim 1, wherein said step of selecting said algorithm and said associated key comprises the steps of:
   providing a collection of spans of addressable areas by listing said lover and upper address limits in pairs;
   providing a linking such that one entry in said collection of addressable spans of areas is linked to only one of said algorithms not excluding the possibility that one of said algorithms can be linked to a plurality of spans of addressable areas in the sense that one algorithm can be used in more than one span of addressable area of said mass storage media;
   using the address of a data item comparing it with all said upper and lower address limits in said collection, thereby detectably finding the pair of lower and upper address limits that encloses said address of said data item; and
   issue a signal or message containing information about said enclosure of said data item address thereby identifying the correct one of said encryption/decryption algorithms by using said linking of algorithms and span of addressable areas.

7. Method according to claim 6, wherein said linking of an upper and lower address pair with an encryption/decryption algorithm and associated key either is a predefined static linking or a dynamically linking.

8. Method according to claim 1, wherein said keys associated with said algorithms are transferred from a carrier of a key to said algorithms over a secure encrypted communication channel by storing said key in a storage element readably connected to said algorithm.

9. Method according to claim 8, wherein the transfer of said keys is done by a secure exchange scheme (Diffie-Hellman key exchange scheme) or with a public private key scheme.

10. Method according to claim 8, wherein said transfer of said keys is done with an authentication process.

11. Method according to claim 8, wherein said key carrier is a device comprising processing element(s) and a non-volatile memory.

12. Method according to claim 11, wherein said key carrier generates an encryption/decryption key in said embedded processor.

13. Method according to claim 8, wherein said secure communication channel is constituted between a key device interface, receivable connected to said carrier of a key, and an encryption/decryption algorithm.

14. Method according to claim 13, wherein said constituted secure channel is an optical and/or a fibre communication channel.

15. Method according to claim 13, wherein said constituted secure channel is a wireless radio communication channel.

16. Method according to claim 13, wherein said constituted secure channel is a wire based communication channel.

17. Method according to claim 1, characterised in providing the steps of:
providing a master boot record of a hard disk system encrypted with one of said plurality of encryption/decryption algorithms with associated key on a key carrier;
reading the content of said smart card thereby enabling a decryption of said master boot record in the identifiable decryption algorithm with associated said key;
transferring the decrypted content of the master boot record to a computer system connected to a hard disk drive system thereby enabling booting of a computer operating system and/or a certain part of a file system and/or a system/user environment and/or other type of partition and/or information stored encrypted on said hard disk drive system to said computer system.

18. Method according to claim 17, wherein said key carrier comprises one of a plurality of master boot records and encryption/decryption keys.

19. Device according to claim 18, wherein an internal ram (31) is connected to said crypto bus (32) via a circuit controller (30).

20. Method of claim 1, wherein,
in said step of providing the plurality of encryption/decryption algorithms with associated encryption/decryption keys, i) each algorithm and key is different from other algorithms and keys, ii) each algorithm and key is associated with a different span of physically addressable area of the mass storage media as enclosed by said upper and lower address limit of the span, and iii) each span is separate from all other spans,
in said step of selecting, said data item is stored encrypted on said media, based on said one algorithm and said associated key, within the two physical addresses defining the upper and lower address limit of the span of addressable area enclosing said address of said data item on said media, and
each number respectively representing locations of each of the at least two physical addresses defining the upper address limit and the lower address limit represents a different block/sector of said media.

21. Device (13) providing encryption (enciphering, scrambling) /decryption (deciphering, de-scrambling) of a data stream transferred to or from a mass storage media streaming through said device (13), wherein the data stream comprises a plurality of data items, each respective data item has a unique associated physical address comprised in the data stream that defines the location on the mass storage media the respective associated data item can be stored or retrieved from, the mass storage media being divided into a plurality of segments, each respective segment comprises consecutively physically addressable readable/writable storage locations, wherein each respective segment is bounded by a lower physical address and an upper physical address of the mass storage media, each of the respective lower physical addresses and the upper physical addresses is part of each of the respective segments, wherein a plurality of encryption/decryption algorithms are associated with each respective segment of the plurality of segments dividing the mass storage media and a plurality of encryption/decryption keys are associated with each respective segment of the plurality of segments dividing the mass storage media, wherein the device comprises:

a plurality of electronic encryption/decryption circuitry sections (41a, 41b, ..., 41n), providing the plurality of encryption/decryption algorithms, with a receivable connected memory space for storing/retrieving the associated encryption/decryption keys;
a comparator circuitry (40) partitioned in a plurality of sections comprising in each section two write-able/readable memory locations (100, 101) loadable with respectively said lower physical address and said upper physical address bounding one of said plurality of segments, two electronic comparator units (102, 103) and a logic gate AND (104) interconnected such that a content loaded into said memory location (100) is compared with an associated physical address (105) from the data stream in said comparator unit (102) to determine if said associated physical address (105) is greater or equal to the content loaded into said memory location (100), and at the same time comparing said associated physical address (105) with the content loaded into said memory location (101) in said comparator unit (103) to determine if said associated physical address (105) is less or equal to the loaded content of said memory location (101), whereby the output of said gate (104) generates an enabling signal, in each said partition of said comparator (40), each said enabling signal is connected to respective ones of said plurality of electronic encryption/decryption circuitry sections (41a, 41b, ..., 41n), thereby also initiating a retrieval of an associated encryption/decryption key from said connected memory space.

22. Device according to claim 21, wherein there is a write-able/readable table in the device (13) of random generated numbers, whereby said associated key with said one of selected algorithm, by said enabling signal, is combined with said random number by a logical or arithmetic operation.

23. Device according to claim 22, wherein the content of said table is predefined and arranged in a plurality of devices (13).

24. Device according to claim 21, wherein said keys associated with said algorithms are transferred from a carrier (63, 65) of a key to said algorithms sections (41a, 41b, ..., 41n) over a secure encrypted communication channel (60) to micro controller (51) in said device (13).

25. Device according to claim 24, wherein the transfer of said keys is done with a Diffie-Hellman key exchange scheme or with a public private key scheme.

26. Device according to claim 24, wherein said transfer of said keys is done with an authentication process.

27. Device according to claim 24, wherein said key carrier (63, 65) is a device comprising processing element(s) and a non-volatile memory.

28. Device according to claim 24, wherein said secure communication channel (6O) is established between said key carrier (63, 65) receivable connected to a key device interface (61), and an encryption/decryption section (41a, 41b, ..., 41n) via said micro controller (51) and an electronic security unit (42).

29. Device according to claim 28, wherein said key device interface (61) is a smart card reader.

30. Device according to claim 24, wherein said secure channel (60) is an optical and/or fibre communication channel.

31. Device according to claim 24, wherein said secure channel (6O) is a wireless radio communication channel.

32. Device according to claim 24, wherein said secure channel (60) is a wire based communication channel.

33. Device according to claim 21, wherein input and output from said plurality of electronic encryption/decryption circuitry sections (41*a*, 41*b*, . . . , 41*n*) is done over a crypto bus (32).

34. Device according to claim 19, wherein an input/output bus (11) and/or an input/output bus (15) in the device (13) can be one of following choice, but not limited to: SCSI, IDE, AT, ATA, USB, FireWire, FiberChannel.

35. Device according claim 19, wherein said input/output bus (11) and input/output bus (15) can be different in which case said device controller (30) execute a protocol translation between said two input/output/buses (11, 15).

36. Device according to claim 19, wherein:
   a master boot record of a hard disk system encrypted with one of said plurality of encryption/decryption algorithms in said electronic encryption/decryption sections (41*a*, 41*b*, . . . , 41*n*) with associated key is stored on a key carrier (63, 65);
   said micro controller (51) reads and transfer said master boot record for storing in said ram (31);
   a connected computer system (10) can then be booted according to the content of said ram 31 via the device controller (30) and said interconnecting bus (11).

37. Device according to claim 19, wherein any e-mail or any type of electronic data as networking traffic can be transferred from said computer system (10) via said bus (11) and device controller (30) to said ram (31), and be encrypted/decrypted over said crypto bus (32), and then be read back to said computer system (10) for further actions.

* * * * *